US012286238B2

(12) United States Patent
Mombrinie

(10) Patent No.: US 12,286,238 B2
(45) Date of Patent: Apr. 29, 2025

(54) SKYPORT FOR eSTOL

(71) Applicant: Bruno Mombrinie, Forestville, CA (US)

(72) Inventor: Bruno Mombrinie, Forestville, CA (US)

(*) Notice: Subject to any disclaimer, the term of this patent is extended or adjusted under 35 U.S.C. 154(b) by 0 days.

(21) Appl. No.: 17/309,525

(22) PCT Filed: Dec. 2, 2019

(86) PCT No.: PCT/US2019/064037
§ 371 (c)(1),
(2) Date: Jun. 3, 2022

(87) PCT Pub. No.: WO2020/117692
PCT Pub. Date: Jun. 11, 2020

(65) Prior Publication Data

US 2025/0042576 A1 Feb. 6, 2025

(51) Int. Cl.
*B64F 1/24* (2006.01)
*B60L 53/80* (2019.01)

(52) U.S. Cl.
CPC ................ *B64F 1/24* (2013.01); *B60L 53/80* (2019.02); *B60L 2200/10* (2013.01)

(58) Field of Classification Search
CPC .... B64F 1/00; B64F 1/22; B64F 1/222; B64F 1/24; B64U 50/39; E01F 3/00; E04H 6/10; E04H 6/187; E04H 6/28; E04H 6/422
See application file for complete search history.

(56) References Cited

U.S. PATENT DOCUMENTS

| | | | | |
|---|---|---|---|---|
| 3,672,517 | A * | 6/1972 | Salloum | E04H 6/10 414/242 |
| 2015/0329219 | A1* | 11/2015 | Soederhuizen | B64F 1/00 244/114 R |
| 2020/0023998 | A1* | 1/2020 | Pawluski | B64F 1/222 |

FOREIGN PATENT DOCUMENTS

WO 2014-084728 A1 6/2014

OTHER PUBLICATIONS

Uber: "Skyport Architecture Reimagined | Uber Elevate" , (May 22, 2018), p. 1, XP054980716, Retrieved from the Internet: URL:https://www.youtube.com/watch?v=f138_I Tsivc (Jul. 23, 2020).

* cited by examiner

*Primary Examiner* — Tye William Abell
*Assistant Examiner* — Justin Michael Heston
(74) *Attorney, Agent, or Firm* — Andrew F. Young, Esq.; Nolte Lackenbach Siegel

(57) ABSTRACT

An urban air mobility building-top skyport for landing, loading and unloading, servicing, and parking short field takeoff and landing (STOL) aircraft, which includes a rotatable flight deck having at least one runway on which aircraft takeoff and land; a rotatable lower deck immediately below the flight deck and including an aircraft taxiway surrounding an enclosed central terminal with an elevator bank; and first and second aircraft ramps connecting the flight deck and the lower deck on which to taxi aircraft between the flight deck and the lower deck. A battery-swap station robotically replaces depleted batteries with fully charged batteries without the need for aircraft to cease moving at slow taxi speeds at any point during the process.

13 Claims, 8 Drawing Sheets

52 60 54 26 40 38 10 50 60 42 30 60 32 38 42 40 36 28

SKYPORT FOR eSTOL

BACKGROUND OF THE INVENTION

Technical Field

The present invention relates most generally to airfields, and more particularly to aircraft landing surfaces for installation on building tops, and still more particularly to a rotating double-deck skyport dimensioned and configured for landing, loading and unloading, servicing, recharging and swapping power supplies, and parking eSTOL or other short field aircraft, for use in an urban air mobility system.

Background Art

Urban population growth is outpacing urban infrastructure. In particular, urban transportation (both passenger and cargo) is woefully lagging behind. Increasing urban density and congestion are introducing increasingly intractable problems, as development of infrastructure is made all the more difficult in developed areas. Solutions range from the non-technical and prosaic (e.g., programs to encourage telecommuting or walking and cycling to work), to the well-worn (better mass rail, light rail, bus, and ferry transportation systems), to the socio-economic (congestion pricing programs), to the exotic—autonomous air taxis (AAT) and urban air mobility (UAM).

UAM, still largely in the conceptual and developmental stage, represents a promising complement to the many other transportation solutions that will undoubtedly emerge. However, research dollars and venture capital are rapidly pouring into this new technology, and its development is correspondingly rapid. Large aerospace and aviation companies, along with optimistic start-ups, have thrown their hats in the ring: Daimler, Bell Air Taxi, Uber Elevate, Blade, Aurora Flight Services, Lilium Aviation, Vertical Aerospace, Joby Aviation, Volocopter, Zee Aero, to name just a few. Most are racing to develop the ideal electric VTOL aircraft and the infrastructure to support an eVTOL system—including AI for autonomous aircraft, air traffic control systems, charging systems, and distributed propulsion systems. These are, of course, mainly focused on the technical aspects of the aircraft itself, yet such advances will ultimately be subordinated to the safety and regulatory schemes under which they will have to operate. Further, simply having safe, autonomous, economically viable electric aircraft suitable for use in the UAM system still leaves unanswered a fundamental question about where they operate in the urban space: where will they land and take off? Will they require urban real estate for skyports and vertiports? How will they gain public acceptance?

Disclosure of Invention

The skyport of the present invention addresses and answers these questions and ensures that the development and implementation of a workable UAM system is kept on a reasonably short timeline. It is a building-top landing field and terminal for landing, loading and unloading, servicing, and parking STOL or other short field aircraft, for use in a UAM using a conventional STOL airplane airframe with a novel short takeoff and landing gear system.

The inventive skyport is designed and organized around three principles and three conditions necessary for the development of this new transportation system, all of which are informed by the objective to gain widespread, rapid public acceptance.

First, safety: Safety is a critical factor to win the public acceptance of autonomous aviation and to respond to public concerns created by the high frequency of flights over densely populated areas. The inventive urban aircraft must exceed the strictest levels of safety currently required of commercial aviation. It achieves this with the most comprehensive application of known methods and with the creation of new safety paradigms.

Second, public acceptance: a UAM system will have a significant impact on local economies and lifestyles. People can be resistant to change. However, with a quiet, safe, elegant aircraft operating out of terminals that do not compromise the public space, but instead contribute to local revenue generation, and a system that decreases traffic congestion and travel times, increases convenience, and exposes the public to the inherently interesting and beautiful experience of "looking at things from a different perspective," UAM may be considered a highly desirable asset. UAM can achieve public support by operating at the highest levels of safety possible, making flights affordable and accessible to all, keeping flights flying high and planes quiet, and creating new revenue streams through landing fees.

Third, high/widespread utilization: The key to user affordability and corresponding financial success depends upon a high volume of use. Assumptions: high utilization requires: (1) faster travel times, thus high cruising speeds (e.g., 400 km/hr); (2) quick clearing of the airspace for high frequency takeoffs and landings on multiple runways (e.g., two flights in and two flights out every 20 seconds); and (3) fast "curbside" loading and unloading turnaround times, which calls for rapid robotic battery swapping, with a three-minute average time from entering the airspace to clearing the airspace.

The inventive skyport is built around and in view of an inventive eSTOL, which is described in detail in co-pending International Patent Application Serial Number PCT/US18/32568, which is incorporated in its entirety by reference herein.

The inventive skyport is designed for construction atop high-rise buildings. The height of these buildings can be anywhere from 20 to 100 stories high. They can be standalone towers with bridge access to other buildings or located at the top of newly constructed buildings. Skyports are not easily added to existing buildings due to the additional elevator capacity required to reach the station.

In a UAM system using the skyport of the present invention, it is contemplated that there would be many skyports in a metropolitan area. Even so, each skyport must be a study in efficiency (as suggested above). The rate at which aircraft can takeoff, land and clear the airspace determines the system capacity and therefore community accessibility and economic profitability.

While maintaining ample separations and buffer zones, the AAT aircraft utilizing the inventive skyports will operate off dual runways allowing for two planes in and two planes out every 20 seconds, for a total of 720 flights per hour (360 flights in plus 360 flights out). This calculation is based on a skyport size of 90×90 meters. For comparison, this is about the size of two American football fields lined up side by side.

The skyport station designed by the present inventor is used for pick up and drop off of passengers and cargo. The skyport is designed with a flight deck and a lower deck below. This makes use of much more space using the same footprint with obvious economic benefits.

Every new skyport will enable the addition of approximately sixty planes to the system. The number varies according to the number of skyport stations in service, the time and duration of peak hours for that station and the overall number of planes and stations already in the system.

Planes are not hangared at the skyport. Rather, the planes are kept and maintained at a central ground facility. The STOL planes are fast, cruising at 400 km/hr. During peak hours the number of planes required is inversely proportional to their speed. The plane departure and arrival rate (DAR) is high, at two planes in and two planes out every 20 seconds. Plane turnaround transit time (TTT) is fast, averaging three minutes. This includes time for robotic battery swapping, inspection and tidying up of the planes, and extra time for passengers to board and load cargo or to deplane and remove belongings.

The size of the skyport is determined by an obvious constraint: the station must be large enough to handle the number of planes in transit. That number is determined by the following: DAR×TTT=number of planes. Therefore, a skyport must be large enough to accommodate a minimum of 18 planes. Calculations show that a skyport is projected to handle over 1000 passengers per hour. Keeping in mind that during peak hours, traffic is typically heavier in one direction than the other (up to 25% of planes could be empty in one direction) and not all planes will be carrying two passengers.

General Design: The entire skyport is constructed to rotate in the manner of a turntable or roundhouse, thus making possible adjustments of the virtual runway path to position takeoffs and landings directly into the wind. Rotating the entire deck is time consuming and requires interruptions in service. Thus, wholesale and large scale adjustments to accommodate a location with typically large shifts in wind direction between morning and afternoon are limited but possible. Using rotation of the entire deck can improve maximum peak capacity by over 30% in some locations. The rotation can be done during off-peak hours.

Lower Deck: As noted, the skyport is designed with a flight deck and a lower deck below. This has economic and safety advantages. The flight deck is an active and dangerous place, and having the space entirely separated from the lower deck is safer for passengers and staff.

The double-deck layout allows for runways without walls or fences around the perimeter, creating no physical or aerodynamic obstacle for the plane to avoid. The lower deck is also sheltered from the elements. People do not have to walk out to or from the planes and are never exposed to the cold, heat, wind, rain, or sun. The space is climate controlled and comfortable.

The lower deck is laid out as a circuit with the flow of traffic going in one direction. This eliminates crossing intersections.

Plane batteries are recharged and then swapped using robotic battery swapping while the planes are moving. Ramps, not elevators, provide routes for planes to move from the flight deck to the lower deck. This eliminates a plane stop and an elevator stop.

The terminal gates for loading and unloading are designed to eliminate backing up, which requires an extra stop. The gates allow nose-in parking and nose-out exit. The terminal is specifically configured to allow for clockwise and counterclockwise movement on the lower deck.

The lower deck is designed to facilitate synchronized movement: for every plane that comes in to the skyport, another must leave, within a small margin of a few planes or a few minutes.

The synchronized timing is currently set at 20 seconds (in the future this value may be reduced to as little as 15 seconds). This means that every 20 seconds, for any given wind speed and wind direction, the exact same event happens at the exact same location in either the left or right pattern and on the flight deck.

The ramps between the flight (takeoff and landing) deck and lower deck can be used as either a down ramp or an up ramp and are used for taxiing aircraft between the lower deck and landing deck. Depending on the wind direction and the orientation of the skyport, the flow on the lower deck becomes clockwise or counterclockwise depending on which way the ramps are designated. The skyport is situated so that a directional shift from clockwise to counterclockwise never occurs during peak hours.

Synchronized movement achieves maximum throughput of planes during peak hours. Required minimum spacing between planes in the air, deliberately wide margins, and conservative traffic rules on the flight deck are maintained at all times.

Two half circles of 4.4 km radius make up the air traffic pattern on either side of the skyport.

Assuming Federal Aviation Administration (or other applicable) rules comport with system capabilities, the planes may maintain a 20-second spacing in the traffic pattern. Each 20-second spacing is a slot.

The arriving planes pick the next available slot as they enter their selected pattern. At the end of the pattern, the planes make a sharp turn into the matching right or left final approach, heading directly into the wind. Depending on the wind conditions, they are approximately 20 seconds out from touchdown.

During peak hours, the skyport does not rotate. It is fixed at the most favorable orientation for that time. The flight deck paths are adjusted to properly guide the planes to or from the up or down ramps of the lower deck.

Full battery charging of fixed batteries is too time consuming and makes poor use of precious space. Accordingly, on the lower deck the planes have their power source quickly swapped using a robotic battery-swapping system. The planes can be charged in the time it takes to plug and unplug a charging cord. As the planes move through the swapping station, a robotic arm on an overhead gantry or track loaded with a replacement battery on the back of a manipulator reaches down, unplugs the battery from one side of the plane, rotates the manipulator, and plugs in the replacement battery. It repeats the process on the other side of the plane. The swap is made in eight to ten seconds. The plane never stops moving as it passes through the battery swapping station on its way to the flight deck.

The center core terminal provides faster access to and from planes. Use of a center core terminal is the most efficient layout, especially during peak hours.

BRIEF DESCRIPTION OF THE DRAWINGS

The invention will be better understood and objects other than those set forth above will become apparent when consideration is given to the following detailed description thereof. Such description makes reference to the annexed drawings wherein.

BEST MODE FOR CARRYING OUT THE INVENTION

Figure 1:
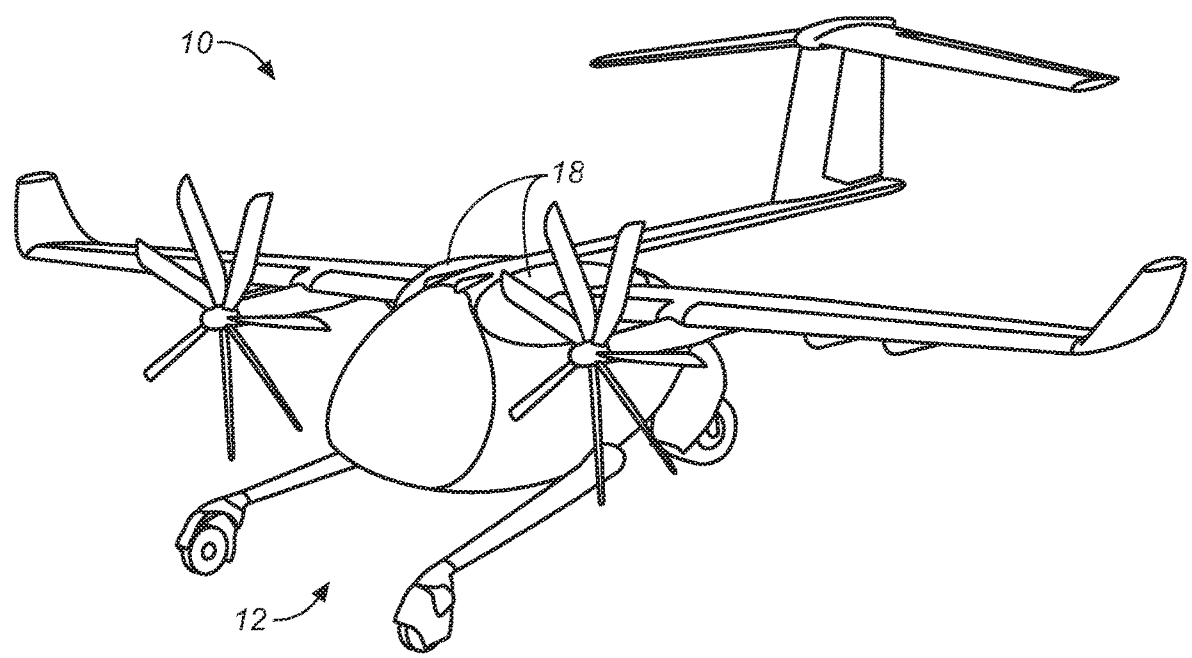
FIG. 1 is an upper-left front perspective view of an eSTOL aircraft of the kind contemplated for use in the skyport system of the present invention, this view featuring the aircraft in a taxiing configuration.
Figure 2:
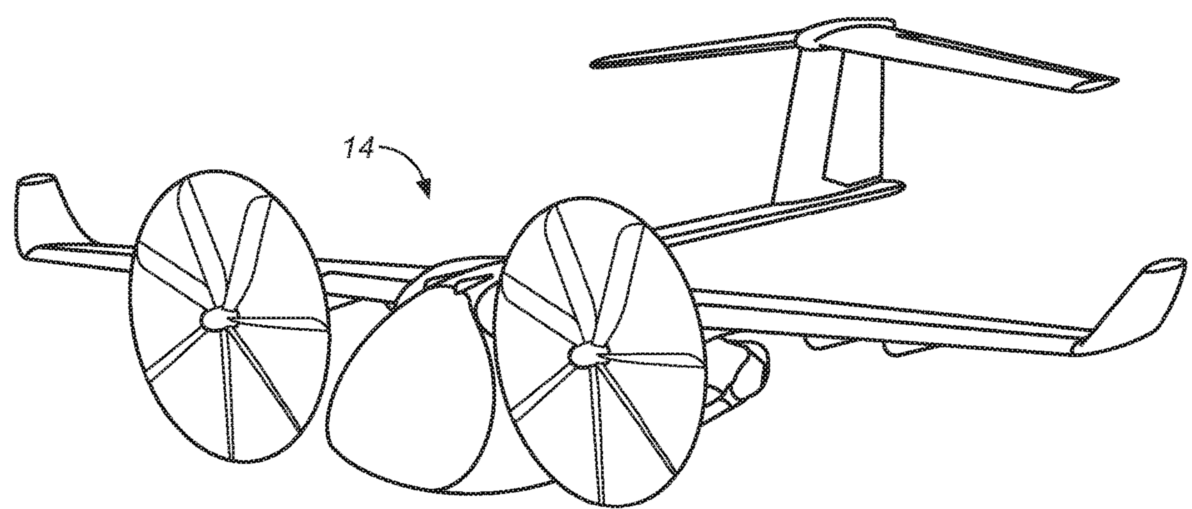
FIG. 2 is the same perspective showing the aircraft in a flight configuration.
Figure 3:
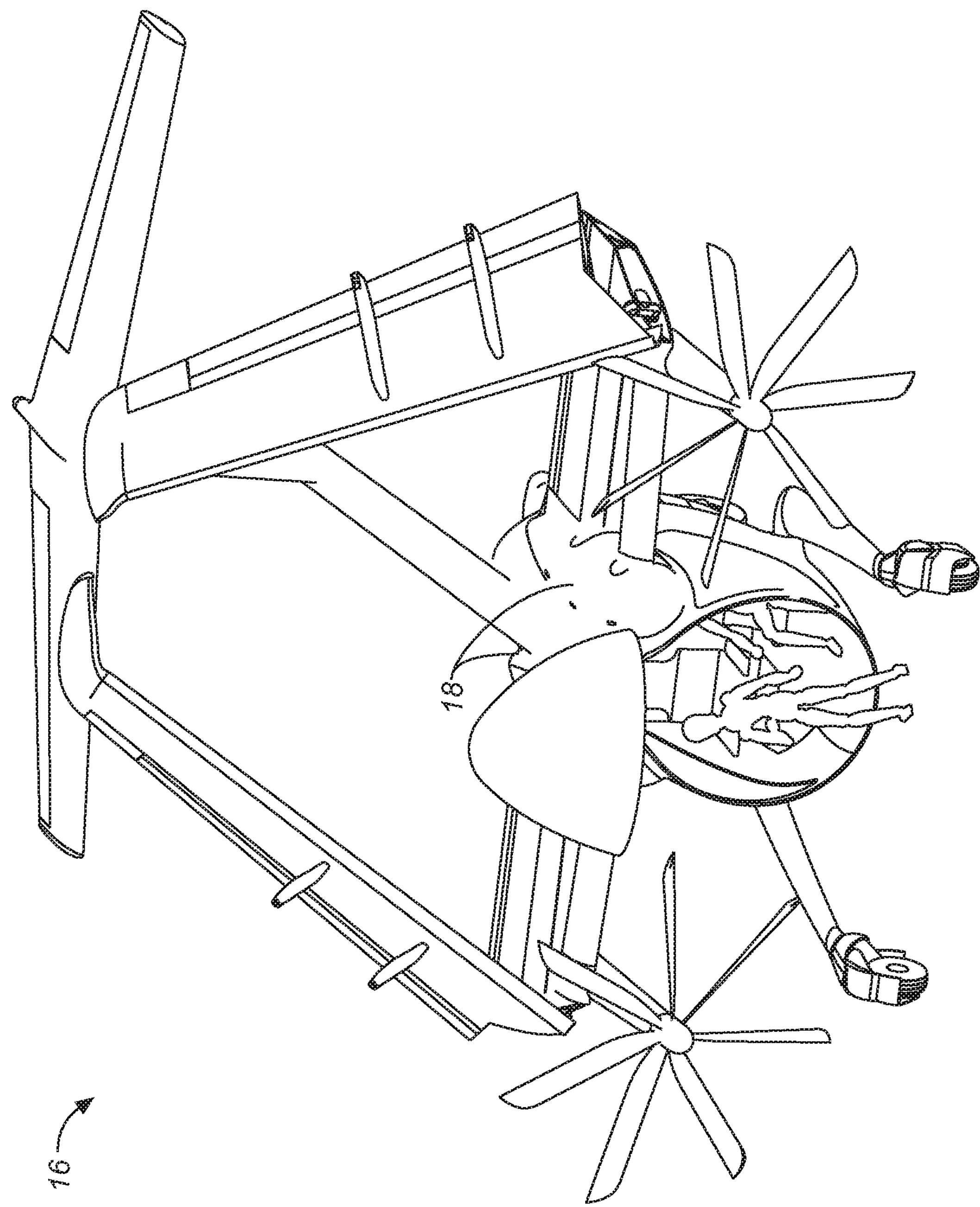
FIG. 3 is the same view showing the aircraft in an loading/unloading, boarding/deplaning configuration.
Figure 4A:
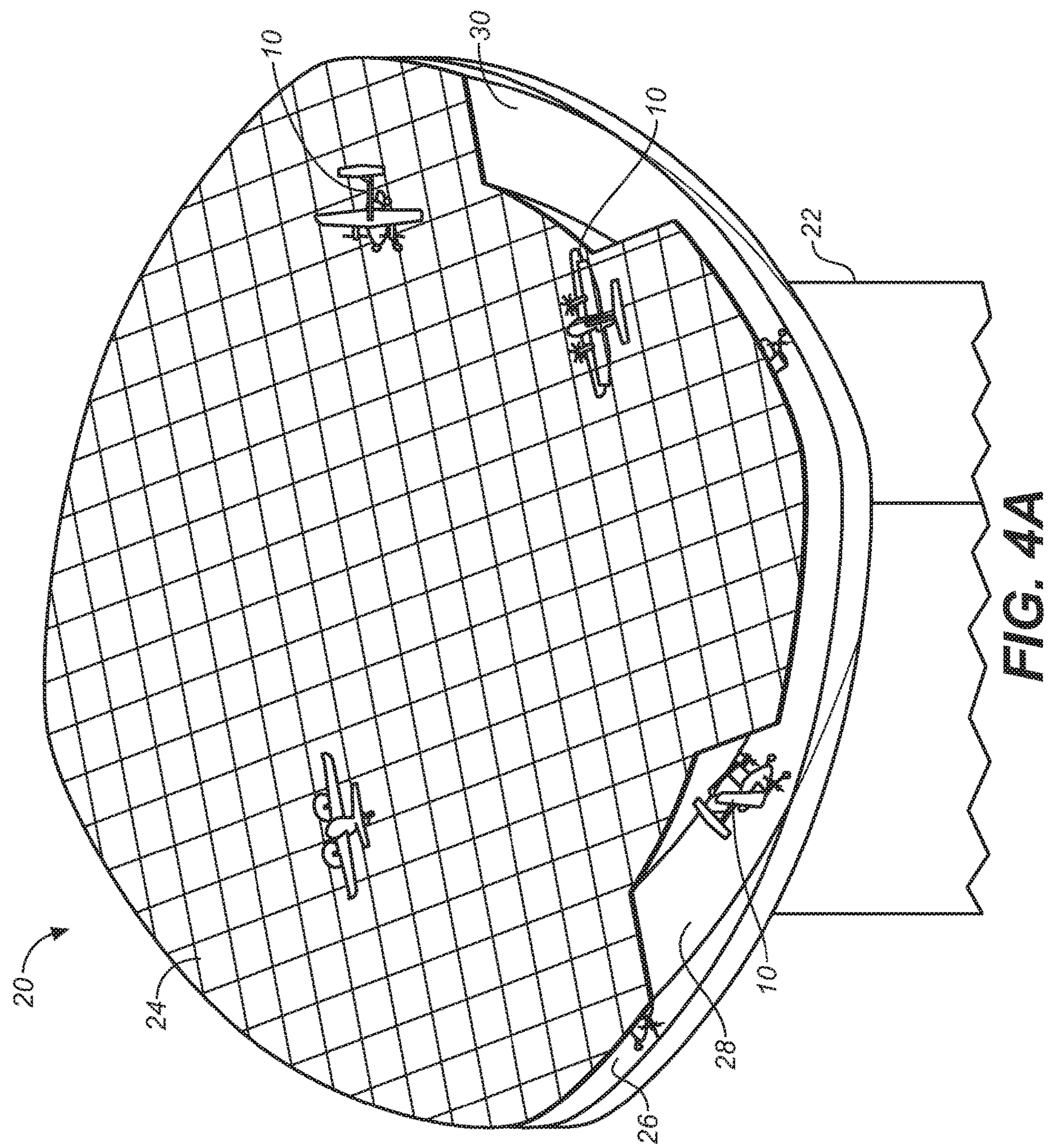
FIG. 4A is an upper perspective view showing the skyport of the present invention constructed on a high-rise building.
Figure 4B:
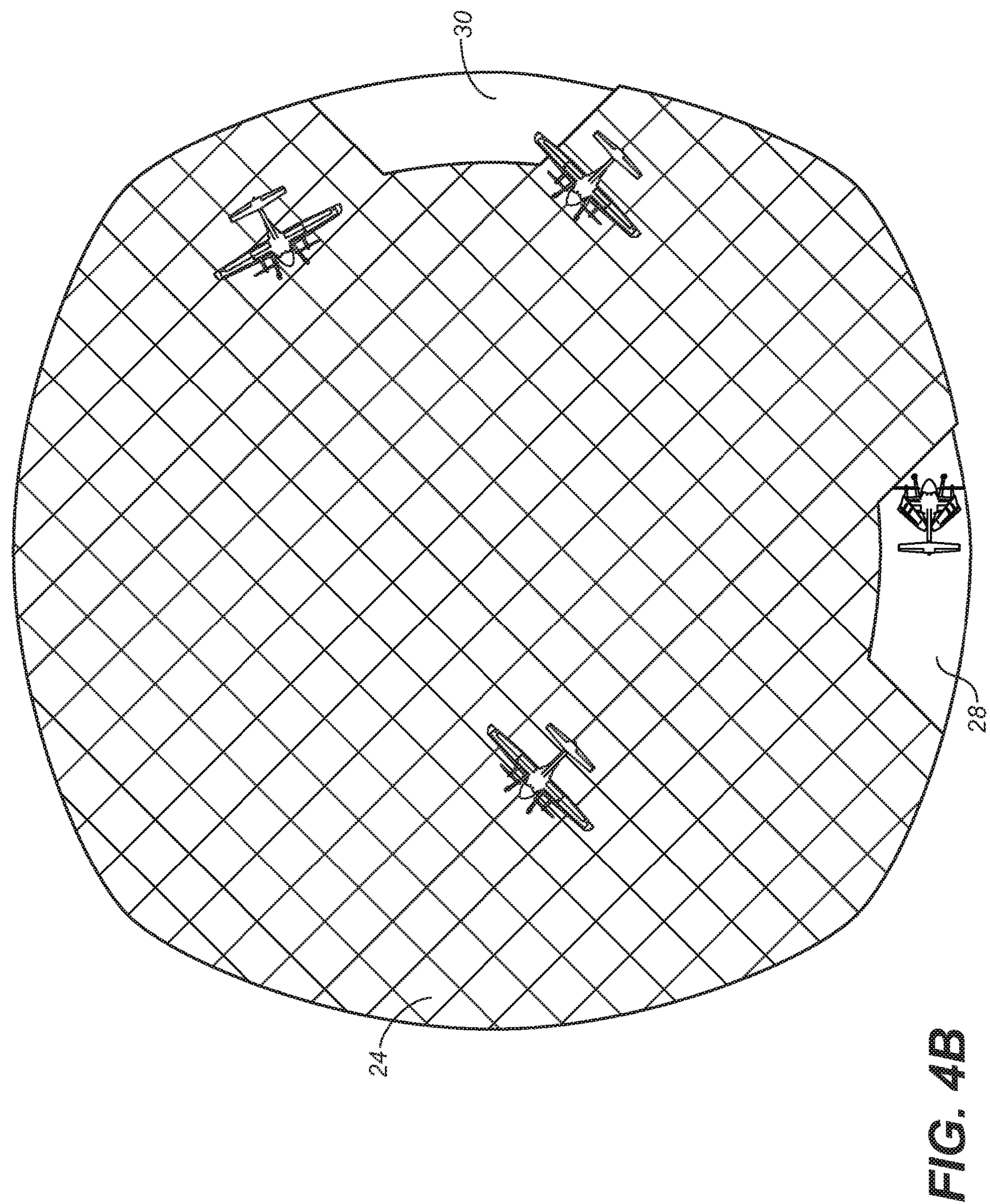
FIG. 4B is a top plan view thereof, featuring the flight deck.

Looking first at FIGS. 1-3, the skyport is adapted for use with an inventive eSTOL aircraft 10, as described and claimed in co-pending International Patent Application Serial Number PCT/US18/32568. The aircraft is a high wing monoplane with a folding wing design and has a taxi configuration 12 [FIG. 1], a flight configuration 14 [FIG. 2], and a loading/unloading configuration 16 [FIG. 3].

General Architecture: The skyport 20 is principally intended for installation or original construction atop a high-rise building 22. It includes an upper-level flight deck 24 and a lower deck 26 immediately below the flight deck. Aircraft on the respective decks access the other deck using two ramps 28, 30 separated roughly 90 degrees relative to one another. Passenger access to the lower deck is possible only from a central core of elevators 32.

Central Core with Elevator Banks: Elevators in the central core of elevators 32 access the lower deck where a terminal 34 is located. The elevators also access an alternate floor within the building. The alternate floor is used to redirect an elevator in the event a passenger needs to be pulled aside for personal, medical or security reasons. Buildings may include one or more dedicated elevators from the ground to the skyport terminal. In others, all elevators may access the skyport terminal, depending on whether the skyport is a general public station or intended only for employees working in the building.

The elevator capacity is designed to handle a passenger volume of approximately 1000 to 1500 passengers per hour. The number of elevators in the building that access the terminal varies with the height of the building, the number of elevators dedicated to terminal access only, and the principal purpose of the station (i.e., general public service vs. building occupant-only service).

Figure 5A:
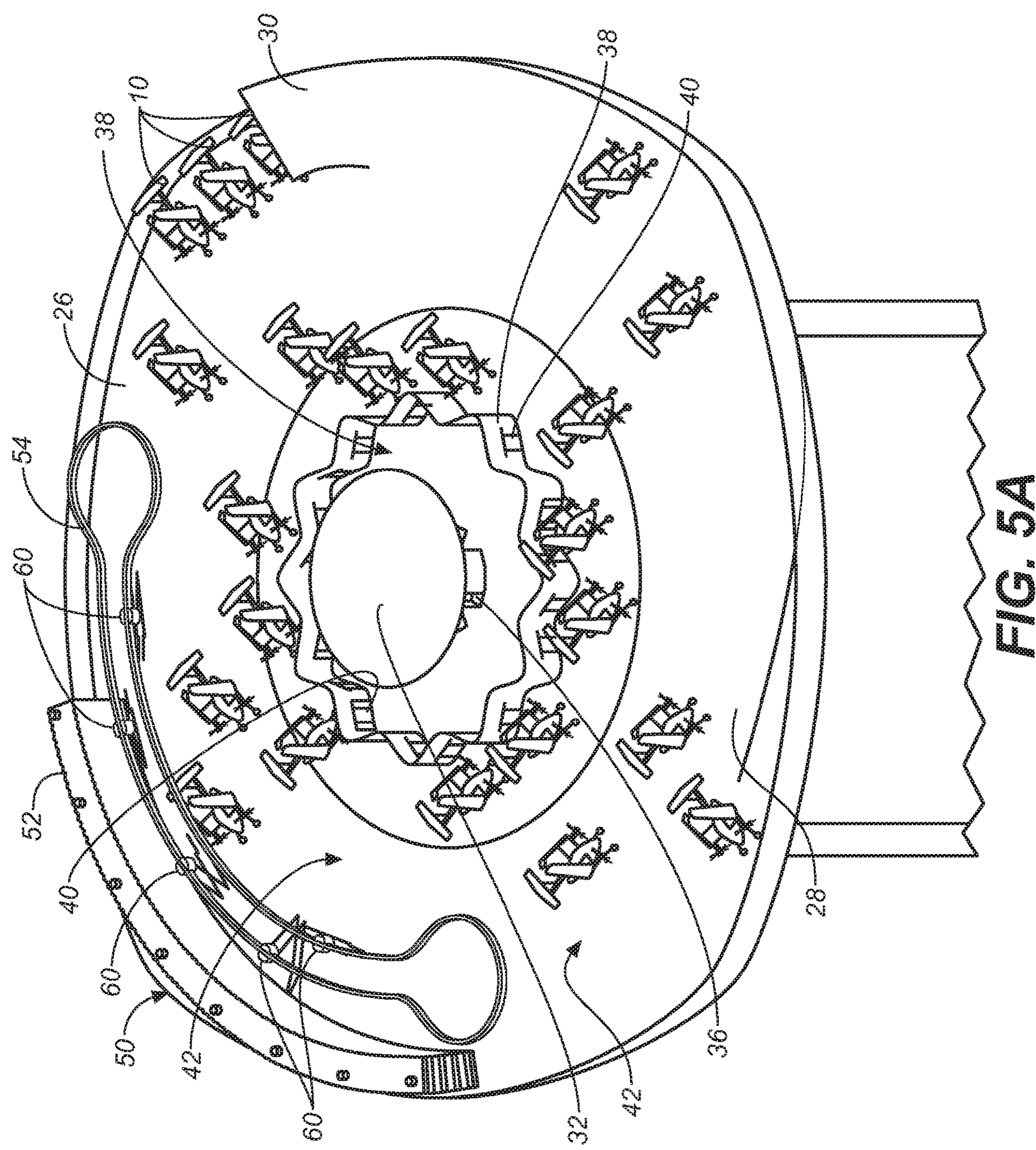
FIG. 5A is an upper partial cutaway perspective view primarily featuring the layout and organization of the lower deck (the "lower deck") immediately below the flight deck.
Figure 5B:
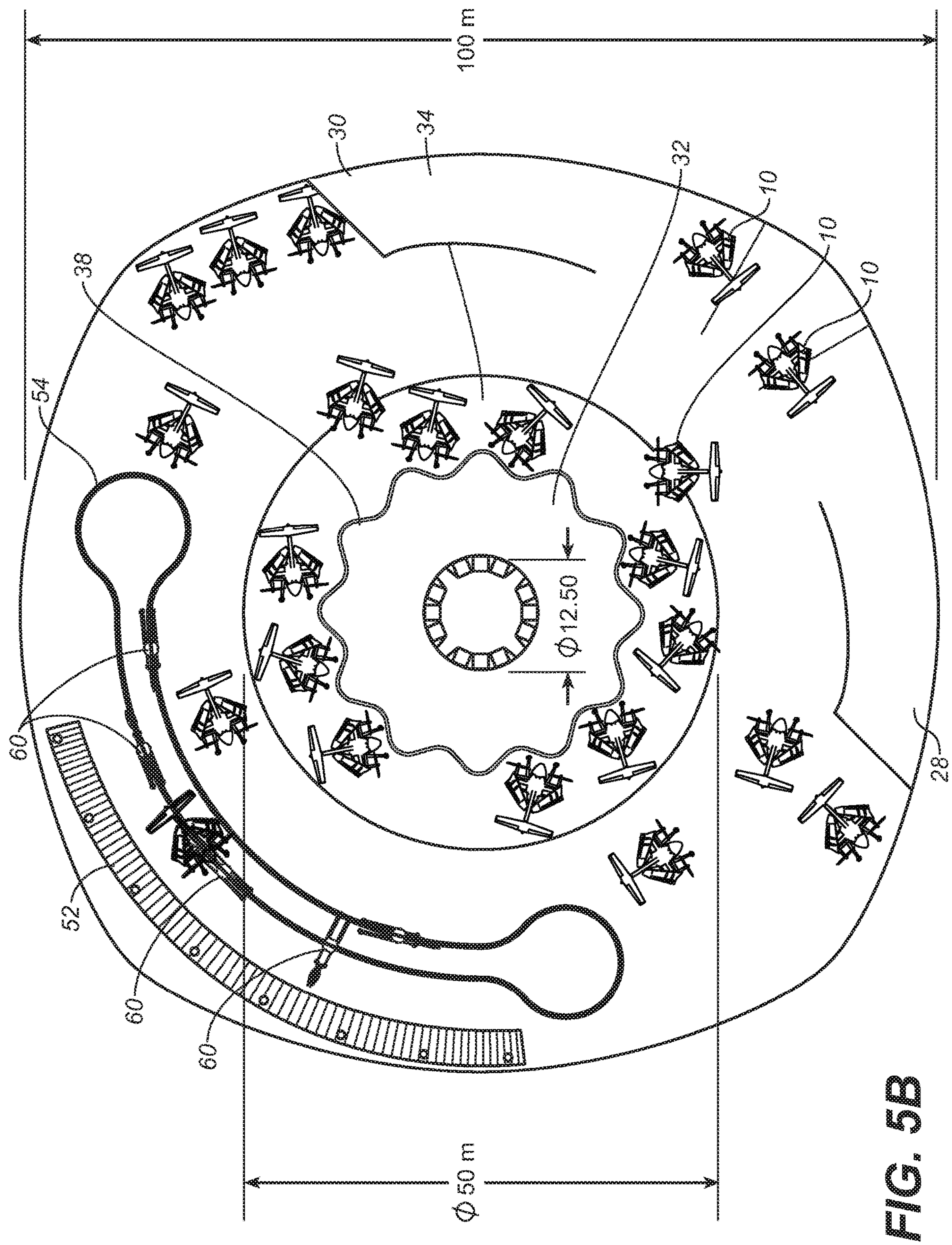
FIG. 5B is a top plan view thereof.
Figure 6:
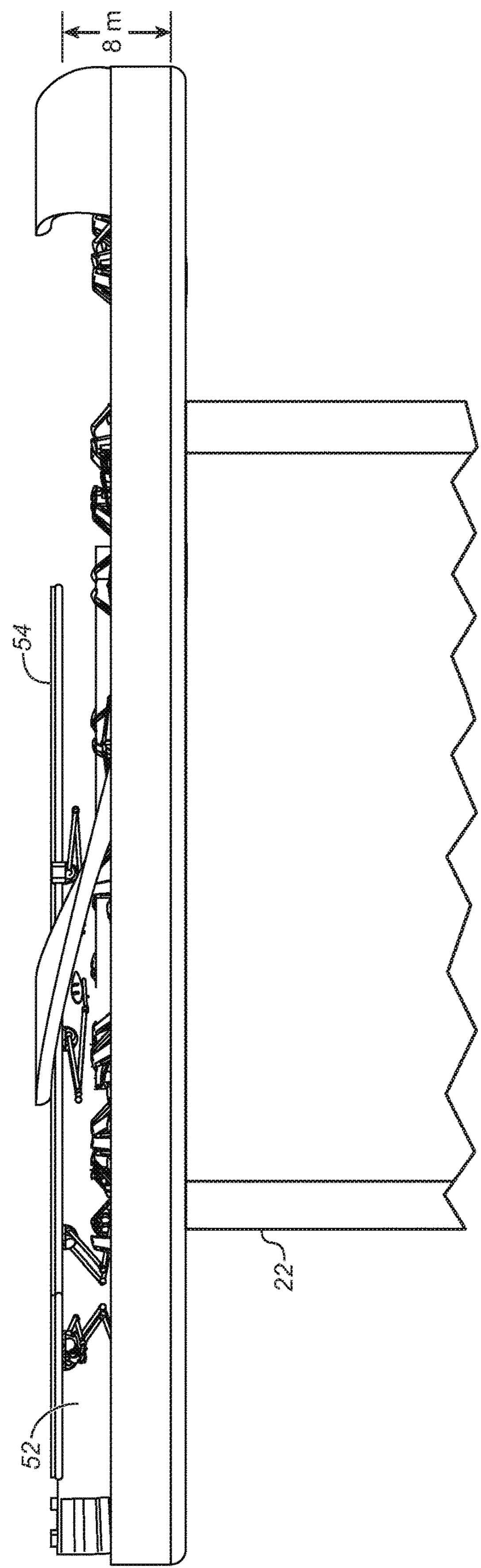
FIG. 6 is a side view in elevation thereof.
Figure 7:
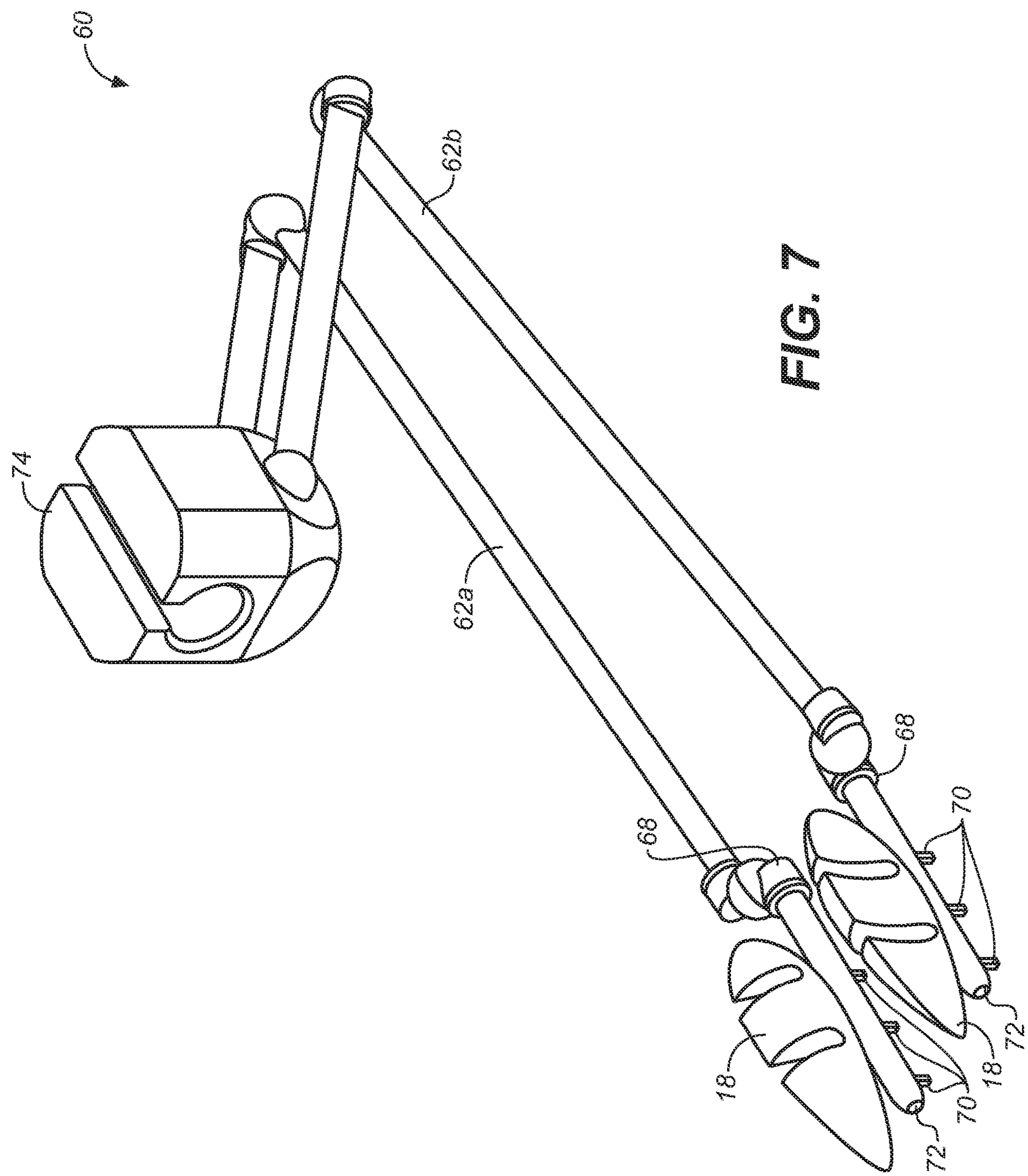
FIG. 7 is an upper perspective view showing the robotic arm, which is a principal component of the battery=swap station of the present invention.

In an embodiment (see FIG. 5B) there is shown a building with 12 elevators with access to the terminal. The elevators as shown have a floor space of 1.6 meters square and are intended for 2 to 3 people with a capacity of 500 kg.

The Terminal: The skyport functions more along the lines of a busy metropolitan train station than an airport terminal: Passengers can easily and quickly move to and from aircraft directly from access elevators. Because time is valuable, efficiency is paramount, and space is limited, it is desirable to minimize the distance between the elevators and the planes.

The terminal provides a fully sheltered, climate-controlled area behind a continuous wall 38 away from the cold, heat, sun, rain, and wind. This not only makes the experience more comfortable, but also expedites the boarding and deplaning process by reducing the time it takes to put on or remove coats and other items. It also reduces the risk of items being blown into active aircraft space.

The skyport terminal includes a snack bar/restaurant, seating areas, restrooms, and an emergency exit stairwell.

The terminal wall 38 surrounds the elevator core and includes a plurality of gates 40 passing through the wall, the wall and gates configured with what might be described as a scalloped, wavy, or gear-shaped exterior so that the planes can pull up close to and alongside one or more gates. Planes are able to steer to one side, allowing for a forward exit from the parking space. This eliminates the need for planes to push back from or to reverse out and away from a gate. In other words, planes may always taxi away from the gates moving forward only, saving valuable time. For aesthetics and visual interest the outside wall of the terminal is preferably glass.

The Lower Deck Layout: The lower deck is laid out as a one-way path (CW or CCW) around the center terminal, the direction governed by the ramp descent direction and with the path beginning and ending together at the bottom of the ramps and shown in the views as a CCW path. A portion of the path is bordered on the outside by a battery hive and robotic swapping terminal for servicing the planes, cleaning them, taking them out of service, and swapping batteries robotically. The path around the circuit is wide enough for planes to pass each other. For safety, a railing wall encloses the open lower-deck floor.

Battery Hive and Robotic Swapping: The battery hive 52 is an array of hexagonal recharging and holding bins. In the embodiment shown (FIG. 5A), it holds 640 pairs of batteries.

A plane has two battery blocks 18 [FIGS. 1, 3]; they are installed as sponsons at the upper portion of the wing roots of each wing.

Robotic arms 60 move in a loop on a ceiling gantry 54 or track on the interior side hive. The robotic arms are conventional multi-axis heavy lift robotic arms as would be found in auto assembly plants. Suitable brands currently include Fanuc, Kuka, and Mitsubishi. The robots sync up with the planes as they move into and through the swapping area. Each robot has a right and left arm 62*a*, 64*b* with a rotating manipulator 66, which is rotated about the final axis 68 in the plurality of axes on the arm that enable a full range of movement to the hive containers to planes and to deliver the battery blocks in both directions. Each manipulator has a row of fingers 70 on each side of a manipulator rod 72 which hold batteries in predetermined orientations. Motors 74 are suspended from the track and have drive wheels (not shown) disposed in a track guide to move the robotic arms either forward or back along the ceiling gantry 54.

The arms operate under programmed motion sequences, such that as the robot and plane move together, the robotic arm synchronizes its speed with the plane and the manipulator begins a swap sequence by holding a charged battery above with empty fingers below. The battery swapping sequence is as follows: The robotic arm approaches one side of the plane having one charged battery disposed on each manipulator of each arm. Thus, the fingers of one side of the manipulator rod are free and empty. The charged battery on one arm is moved into place in a superior position with the opposing empty fingers poised to remove the spent battery on the plane. When properly positioned, the manipulator is moved down and the fingers grab the depleted battery from one side of the plane. The arm retracts slightly to pull up and away from the wing root, and rotates 180 degrees (i.e., the depleted battery is rotated to be disposed above the manipulator. The manipulator rotates 180 degrees to place the charged battery into position for installation, and the manipulator then inserts the recharged battery into the plane.

After swapping is completed on a first side, the other side performs the same routine. This sequence occurs in this order so that planes always have one battery plugged in. Simulations show that the entire process takes approximately 12 seconds.

Lower-Deck Dimensions: To clear the height of the folded aircraft wings on the deck and on the ramps, the ceiling height is 8 meters.

Data Dump: The battery blocks also contain the memory blocks for the huge amounts of data that are collected on all aspects of the aircraft's flight and health. During the charging process, that information is retrieved and archived.

Up and Down Ramps: The ramps 28, 30 physically link the flight deck to the lower deck. The planes normally taxi on the ramps with wings folded. However, the ramps are wide enough should it become necessary to taxi with the wings extended. The ramps are approximately 50 meters long, curved, and slightly banked into the turn. Ramps are used rather than elevators because it is faster and more energy efficient.

Flight Deck: To shed rainwater and for optimal traction for aircraft wheels, the flight deck is covered with a high-traction, fast-draining surface. This surface may be porous asphalt, porous concrete or the polyurethane material commonly used in all-weather running tracks. Brands for running track materials include Mondo and Tartan. The flight deck has a grid pattern painted on the surface to assist the machine-vision systems in the planes to orient themselves.

To minimize the surface area or footprint of the flight deck, there is no fence around the perimeter that presents an obstacle for the aircraft to clear. This also eliminates a possible point of dangerous turbulence on the edge of the flight deck.

The flight deck is closed to passengers. The flight deck is also closed off to anything but aircraft and system personnel actively engaged in the synchronized process of departing or arriving aircraft. This reduces the chances of confusion, runway incursions, and other potential incidents.

Skyport Station Rotation: Carefully calculated estimates of a typical skyport mass for use with the inventive AAT is 2000 tons, excepting central elevator weights. The structure rotates no faster than 0.1 m/sec. This rotation is to optimize the synchronized movement of arriving and departing planes moving on and off the ramps. Unless other constraints limit departure and approach paths (taller nearby buildings, for instance), the planes always takeoff and land directly into the wind. The runways and the taxiways are not marked but are constantly variable paths determined by the wind speed and wind direction. Rotating the whole structure is useful in locations where wind direction shifts dramatically between the morning and afternoon or changes dramatically by season. Rotating the structure is slow and interrupts service; therefore, it is only used for gross adjustments while the fine adjustments are made with the variable paths, which can be adjusted seamlessly and instantly.

From the foregoing, it is seen that in its most essential aspect, the inventive skyport is a building-top facility for landing, loading and unloading, servicing, and parking short field takeoff and landing (STOL) aircraft, which includes a rotatable flight deck having at least one runway on which aircraft takeoff and land; a rotatable lower deck immediately below the flight deck and including an aircraft taxiway surrounding an enclosed central terminal with an elevator bank; and first and second aircraft ramps connecting said flight deck and the lower deck on which to taxi aircraft between the flight deck and the lower deck. A battery-swap station robotically replaces depleted batteries with fully charged batteries without the need for aircraft to cease moving at slow taxi speeds at any point during the process.

The foregoing disclosure is sufficient to enable those with skill in the relevant art to practice the invention without undue experimentation. The disclosure further provides the best mode of practicing the invention now contemplated by the inventor.

While the particular UAM system herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A building-top skyport for landing, loading and unloading, servicing, and parking short field takeoff and landing (STOL) aircraft, comprising:

a rotatable flight deck having at least one runway on which aircraft takeoff and land;

a rotatable lower deck immediately below said flight deck, said lower deck including an aircraft taxiway surrounding an enclosed central terminal with an elevator bank; and first and second aircraft ramps connecting said flight deck and said lower deck on which to taxi aircraft between said flight deck and said lower deck.

2. The skyport of claim 1, further including a battery-swap system for changing plane batteries.

3. The skyport of claim 2, wherein said battery-swap system includes at least one robot having a manipulator arm configured to unplug an aircraft battery and replace it with a charged battery.

4. The skyport of claim 3, wherein said battery-swap system is an array having a plurality of recharging and holding bins in which batteries are stored and charged.

5. The skyport of claim 4, wherein said at least one robot has first and second arms, each with a rotating manipulator, configured such that one arm removes a battery and the other arm replaces it with a charged battery.

6. The skyport of claim 5, wherein said first and second arms operate under programmed motion sequences with speed synchronized with a plane in service, replacing one battery on one side of the aircraft first and then a second battery on the other side of the aircraft thereafter, thereby ensuring that the aircraft always has at least one operable battery installed during the battery-swap process.

7. The skyport of claim 4, wherein said at least one robot moves in a loop on an overhead gantry.

8. The skyport of claim 1, wherein said taxiway is a reversible one-way circuit.

9. The skyport of claim 8, wherein said ramps are separated approximately 90 degrees around said one-way circuit in relation to one another.

10. The skyport of claim 1, wherein said taxiway is a one-way circuit.

11. The skyport of claim 1, wherein said lower deck is enclosed and climate controlled.

12. The skyport of claim 1, wherein said central terminal is surrounded by terminal gates configured for one-way, nose-in/nose-out movement of aircraft to and from said gates.

13. The skyport of claim 1, wherein said flight deck measures approximately 90 meters by 90 meters.

* * * * *